United States Patent
Chhillar et al.

(10) Patent No.: US 9,485,550 B2
(45) Date of Patent: Nov. 1, 2016

(54) SYSTEMS AND METHODS FOR SELECTION OF OPTIMAL ROUTING PARAMETERS FOR DWDM NETWORK SERVICES IN A CONTROL PLANE NETWORK

(71) Applicants: Mohit Chhillar, Pitam Pura (IN); Anurag Prakash, Noida (IN); Seemant Bisht, New Delhi (IN); Hari Srinivasan, Gurgaon (IN)

(72) Inventors: Mohit Chhillar, Pitam Pura (IN); Anurag Prakash, Noida (IN); Seemant Bisht, New Delhi (IN); Hari Srinivasan, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 93 days.

(21) Appl. No.: 14/482,336

(22) Filed: Sep. 10, 2014

(65) Prior Publication Data
US 2016/0037239 A1    Feb. 4, 2016

(30) Foreign Application Priority Data

Jul. 30, 2014  (IN) .......................... 2151/DEL/2014

(51) Int. Cl.
*H04Q 11/00*      (2006.01)
*H04J 14/02*      (2006.01)

(52) U.S. Cl.
CPC ....... *H04Q 11/0003* (2013.01); *H04J 14/0227* (2013.01); *H04Q 11/0005* (2013.01); *H04Q 11/0062* (2013.01); *H04Q 2011/0073* (2013.01)

(58) Field of Classification Search
USPC .......................................... 398/49
See application file for complete search history.

(56) References Cited

U.S. PATENT DOCUMENTS

| | | | |
|---|---|---|---|
| 7,027,388 B2 | 4/2006 | Wen et al. | |
| 7,330,425 B1 | 2/2008 | Gulati et al. | |
| 7,391,720 B1 | 6/2008 | Kuditipudi et al. | |
| 8,289,879 B2 | 10/2012 | Brown | |
| 8,559,812 B2 | 10/2013 | Oltman et al. | |
| 8,682,160 B2 | 3/2014 | Prakash et al. | |
| 8,750,706 B2 | 6/2014 | Boertjes et al. | |
| 8,818,198 B2 | 8/2014 | Trnkus et al. | |
| 2002/0109879 A1* | 8/2002 | Wing So | H04J 7/00 398/58 |
| 2003/0020977 A1* | 1/2003 | Smith | H04J 14/0283 398/5 |
| 2005/0089027 A1* | 4/2005 | Colton | H04Q 11/0005 370/380 |
| 2005/0259571 A1* | 11/2005 | Battou | G06F 8/65 370/217 |
| 2010/0104282 A1 | 4/2010 | Khan et al. | |
| 2010/0172236 A1* | 7/2010 | Madrahalli | H04J 3/14 370/225 |
| 2013/0177305 A1 | 7/2013 | Prakash et al. | |
| 2013/0272318 A1 | 10/2013 | Swinkels et al. | |
| 2013/0308948 A1 | 11/2013 | Swinkels et al. | |
| 2014/0126899 A1* | 5/2014 | Prakash | H04L 45/28 398/5 |
| 2014/0205278 A1 | 7/2014 | Kakkar et al. | |
| 2015/0365294 A1* | 12/2015 | Khan | H04L 67/00 370/254 |

* cited by examiner

Primary Examiner — David Payne
Assistant Examiner — Omar S Ismail
(74) Attorney, Agent, or Firm — Clements Bernard PLLC; Christopher L. Bernard; Lawrence A. Baratta, Jr.

(57) ABSTRACT

A method, in an intermediate node in a control plane network, includes receiving a setup message from an originating node, wherein the setup message is sent towards a terminating node on a computed path in the control plane network, and the setup message indicates associated Layer 0 attributes; validating the associated attributes/constraints based on locally available resources; and performing one of: forwarding the setup message on the path towards the terminating node when validation is successful; forwarding the setup message on the path towards the terminating node with updated information indicating a rejection cause and additional information when the validation is unsuccessful, but a modification of the Layer 0 attributes/constraints is possible; and forwarding a release message on the path back to the originating node with updated information indicating a rejection cause and additional information when the validation is unsuccessful and no modifications of the Layer 0 attributes/constraints are possible.

20 Claims, 8 Drawing Sheets

SYSTEMS AND METHODS FOR SELECTION OF OPTIMAL ROUTING PARAMETERS FOR DWDM NETWORK SERVICES IN A CONTROL PLANE NETWORK

FIELD OF THE DISCLOSURE

The present patent application/patent claims the benefit of priority of Indian Patent Application No. 2151/DEL/2014, filed on Jul. 30, 2014, and entitled "SYSTEMS AND METHODS FOR SELECTION OF OPTIMAL ROUTING PARAMETERS FOR DWDM NETWORK SERVICES IN A CONTROL PLANE NETWORK," the contents of which are incorporated in full by reference herein.

FIELD OF THE DISCLOSURE

The present disclosure relates generally to networking systems and methods. More particularly, the present disclosure relates to systems and methods for selection of optimal routing parameters for Dense Wave Division Multiplexing (DWDM) network services in a control plane network.

BACKGROUND OF THE DISCLOSURE

Optical (i.e., transport) networks and the like (e.g., DWDM, Synchronous Optical Network (SONET), Synchronous Digital Hierarchy (SDH), Optical Transport Network (OTN), Ethernet, and the like) at various layers are deploying control plane systems and methods. Control planes provide automatic allocation of network resources in an end-to-end manner. Exemplary control planes may include Automatically Switched Optical Network (ASON) as defined in ITU-T G.8080/Y.1304, Architecture for the automatically switched optical network (ASON) (02/2005), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections such as Subnetwork Connections (SNCs) in ASON or OSRP and Label Switched Paths (LSPs) in GMPLS and MPLS. Control planes use the available paths to route the SNCs/LSPs and program the underlying hardware accordingly.

For Layer 0 Networks (DWDM), it would be advantageous to calculate routes which adhere to the network constraints/nodal characteristics or the inventory supported on the nodes in the path through the control plane. This could include regenerator configuration, partial connectivity, wavelength (λ) contention, wavelengths supported, etc. In Layer 0 networks some node level parameters are not flooded to the network through the control plane. This is because the constraints could be many and it is inefficient to flood them into the network. This is not true for Layer 1 networks since the constraints are limited, they are all flooded in the network. Examples of some hidden constraints in Layer 0 networks are intra nodal connectivity and regenerator related information/constraints. Of course, these constraints in Layer 0 network can invalidate a route during call setup.

There are a couple conventional options to solve these limitations, namely 1) flood all the hidden information/constraints at Layer 0 and incorporate these into the path computation engine/validation, 2) use crank backs to re-route the call if faced with problems based on the constraints, or 3) rely on a centralized approach. Again, it would be non-optimal to advertise all this information and use it in path computation. This impacts scalability of the network for control plane applications. Relying on crank backs can lead to blocking/delayed setup of services. Thus it is non-optimal and inefficient. Finally, the centralized approach is static and can be based on outdated configurations which can also lead to crank backs.

In conventional Layer 0 control plane networks, when a crank back happens in the network not much information is present in a Release message about the exact cause of the crank back which will help in making alternative decisions effectively at the originating node. Also, the crank back originates at the first instance of failure along the setup path. There could be multiple crank back possibilities along the path across multiple nodes and links that are beyond the first point of call rejection and are not visible in the existing model. The above scenario is quite possible when the alternate paths to the destination are not fully diverse. This could result in more retries along the problem path and crank back failures due to lack more insight further along the path from the point of crank back.

BRIEF SUMMARY OF THE DISCLOSURE

In an exemplary embodiment, a method, in an intermediate node in a control plane network, for selecting optimal routing parameters for Dense Wave Division Multiplexing (DWDM) network services includes receiving a setup message from an originating node, wherein the setup message is sent towards a terminating node on a computed path in the control plane network, and the setup message indicates associated Layer 0 attributes/constraints; validating the associated Layer 0 attributes/constraints based on locally available resources; and performing one of: forwarding the setup message on the path towards the terminating node when validation is successful; forwarding the setup message on the path towards the terminating node with updated information indicating a rejection cause and additional information, when the validation is unsuccessful but a modification of the Layer 0 attributes/constraints is possible; and transmitting a release message on the path back to the originating node with updated information indicating a rejection cause and additional information when the validation is unsuccessful and no modifications of the Layer 0 attributes/constraints are possible. The setup message can be received at the terminating node after the intermediate node, and wherein the terminating node is configured to perform one of: establishing a connection if the setup message was successfully validated at all nodes in the path; and transmitting the release message on the path back to the originating node with rejection causes and additional information from all intermediate nodes included therein.

The method can further include receiving the release message from the terminating node; updating the additional information in the release message if required at the intermediate node; and forwarding the release message on the path back to the originating node. The originating node can be configured to receive the release message from the terminating node, extract and review the rejection causes and additional information included therein, and determine a retry on the path with revisions to the Layer 0 attributes/ constraints based on the reviewing or a retry on an alternate path. The setup message can be determined at the terminating node as successfully validated at all nodes in the path, based on an absence of information elements with the updated information in the setup message received at the terminating node. Layer 0 information is not flooded in the control plane network. The updated information, in the setup message or the release message, indicating the rejection cause and the additional information is a new information element.

The Layer 0 attributes/constraints are any one or more of: regenerator port assignments; regenerator port assignments for a specific wavelength; modem type; drop port type being either colored or colorless; and degree connectivity at each node. The validating can include comparing the locally available resources, at the intermediate node, with the Layer 0 attributes/constraints in the setup message and any of the rejection causes and additional information; and the method can further include modifying the setup message based thereon or generating the release message based thereon. The validating can include determining that a regenerator port is unavailable per the Layer 0 attributes/constraints at the intermediate node; and the method can further include updating the setup message with the rejection cause and the additional information indicates which regenerator ports are available at the intermediate node. The validating can include determining that a regenerator port is unavailable per the Layer 0 attributes/constraints at the intermediate node based on wavelength contention for a specific wavelength; and the method can further include updating the setup message with the rejection cause and the additional information indicates which alternate wavelengths are available at the intermediate node.

The validating can include determining that a regenerator port is unavailable per the Layer 0 attributes/constraints at the intermediate node based on unavailability of a specific wavelength; and the method can further include updating the setup message with the rejection cause and the additional information indicates which alternate wavelengths are available at the intermediate node. The validating can include determining a modem type mismatch per the Layer 0 attributes/constraints at the intermediate node; and the method can further include generating the release message based on the modem type mismatch with the updated information based thereon. The terminating node can be configured to determine a mismatch between drop port type with the originating node; and the terminating node can be configured to transmit the release message based on available drop port types at the terminating node. The method can further include determining a partial connectivity block at the intermediate node; and generating the release message based on the partial connectivity block with the updated information based thereon.

In an exemplary embodiment, an intermediate node in a control plane network, for selecting optimal routing parameters for Dense Wave Division Multiplexing (DWDM) network services includes one or more ports communicatively coupled to one or more adjacent nodes; and a controller communicatively coupled to the one or more ports, wherein the controller is configured to: receive, via the one or more ports, a setup message from an originating node, wherein the setup message is sent towards a terminating node on a computed path in the control plane network, and the setup message indicates associated Layer 0 attributes/constraints; validate the associated Layer 0 attributes/constraints based on locally available resources; and perform one of: forward the setup message on the path towards the terminating node when validation is successful; forward the setup message on the path towards the terminating node with updated information indicating a rejection cause and additional information when the validation is unsuccessful, but a modification of the Layer 0 attributes/constraints is possible; and transmit a release message on the path back to the originating node with updated information indicating a rejection cause and additional information when the validation is unsuccessful and no modifications of the Layer 0 attributes/constraints are possible.

Layer 0 information is not flooded in the control plane network. The terminating node can be configured to receive the setup message, and perform one of: establish a connection if the setup message was successfully validated at all nodes in the path, and transmit the release message on the path back to the originating node with rejection causes and additional information from all intermediate nodes included therein. The controller can be further configured to: receive the release message from the terminating node; update the additional information in the release message if required; and forward the release message on the path back to the originating node.

In yet another exemplary embodiment, a network includes a plurality of nodes interconnected by a plurality of links; an originating node of the plurality of nodes configured to send a setup message to a terminating node of the plurality of nodes with associated Layer 0 attributes/constraints in the setup message; and one or more intermediate nodes of the plurality of nodes, wherein the one or more intermediate nodes are in a path between the originating node and the terminating node, wherein the one or more intermediate nodes are configured to validate the associated Layer 0 attributes/constraints sequentially; wherein, each of the one or more intermediate nodes is configured to perform one of: forward the setup message on the path towards the terminating node when validation is successful; forward the setup message on the path towards the terminating node with updated information indicating a rejection cause and additional information when the validation is unsuccessful, but a modification of the Layer 0 attributes/constraints is possible; and transmit a release message on the path back to the originating node with updated information indicating a rejection cause and additional information when the validation is unsuccessful and no modifications of the Layer 0 attributes/constraints are possible.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods for selection of optimal routing parameters for DWDM (Layer 0) network services are described. The systems and methods describes a mechanism which includes aggregation of rejection cause codes along the path and any additional/useful information added by the rejecting node(s) along the path to the destination. Thus, the systems and methods avoid requirements to advertise Layer 0 constraints. Instead, a setup message from an originating (source) node propagates towards a terminating node with attributes/constraints associated with Layer 0, and intermediate nodes can add/modify suggestions on the attributes/constraints (if there are issues) along the way. If the setup message reaches the terminating node with attributes/constraints that are not met, the terminating node can send a release message (a crank back) with all of the modified information in the attributes/constraints thereby enabling the originating node to recompute the path with appropriate insight into the attributes/constraints. Advantageously, this approach works at run time (service creation) thereby avoiding inefficient flooding, leads to faster redials in networks, and yields a better utilization of networks resources by avoiding service blocking. Exemplary attributes/constraints for DWDM (Layer 0) may include wavelength and other service characteristics supported by the path such as, without limitation, regenerator port unavailable/unavailable for certain wavelengths, contention for a certain wavelength, regenerator modem type mismatch, terminating drop port is colored/colorless, partial connectivity, etc.

Exemplary Control-Plane Network

Figure 1:
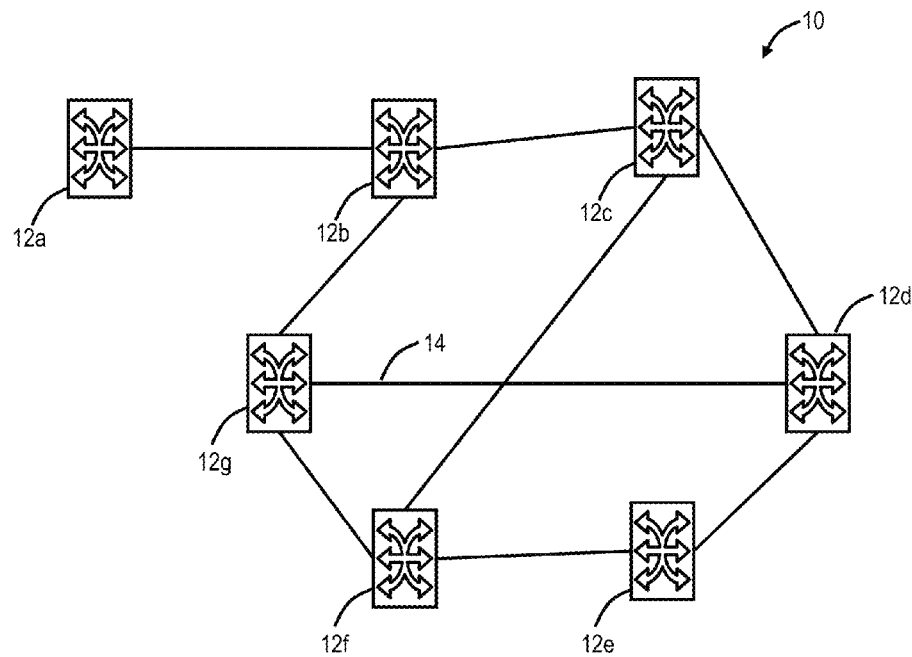
FIG. 1 is a network diagram of a network with various interconnected nodes operating a control plane.
Figure 12:
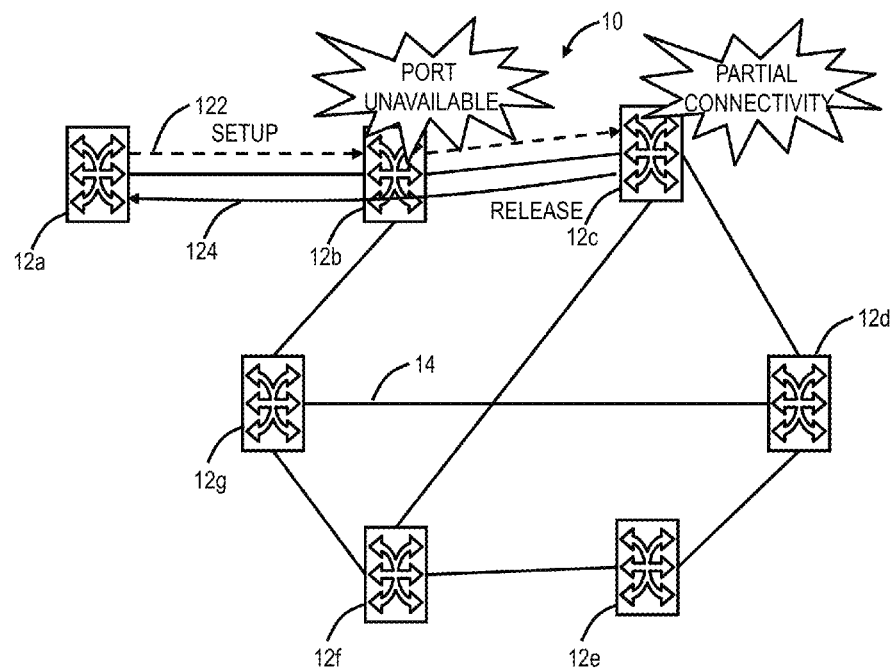
FIGS. 12-13 are network diagrams of the network FIG. 1 showing a setup of yet another signaled connection with the aggregation process of FIG. 5

Referring to FIG. 1, in an exemplary embodiment, a network diagram illustrates a network 10 with various interconnected nodes 12a-12g operating a control plane. Each of the nodes 12a-12g are interconnected by one or more links 14. The nodes 12a-12g can be network elements such as optical switches, add/drop multiplexers, cross-connects, etc. that operate the control plane (e.g., ASON, GMPLS, OSRP, etc.) and provide signaled connections therebetween (e.g., SNCs, LSPs, etc.). An exemplary implementation of a node 12 is illustrated in FIG. 12. The links 14 include a Layer 0, Layer 1, Layer 2, and/or a Layer 3 component. For example, as described herein, Layer 0 is DWDM—i.e., wavelengths physically forming the links 14. The Layer 1 component may include OTN, SONET, SDH, etc., the Layer 2 component may include Ethernet, MPLS, etc., and the Layer 3 component may include IP, etc. For illustration purposes herein, the control plane operates at least at Layer 0 and Layer 1. A new signaled connection (e.g., SNC, LSP, etc.) represents both a Layer 0 and Layer 1 component. As described herein, the Layer 1 attributes/constraints are limited and fully flooded by the control plane. Thus, an originating node may compute a path for the signaled connection at Layer 1. However, the Layer 0 attributes/constraints are not fully flooded. Thus, the originating node may provide a specific set of attributes/constraints or a range of attributes/constraints that are evaluated at each intermediate node in the path during call setup.

Conventional Crank Backs Due to Layer 0 Attributes/Constraints

Figure 2:
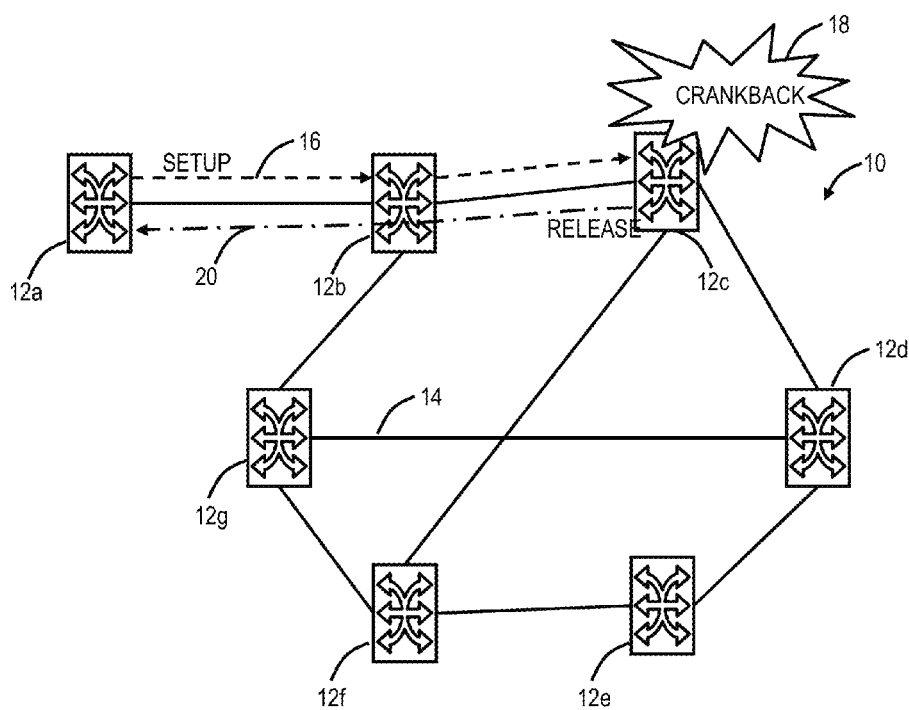
FIGS. 2-4 are network diagrams of the network of FIG. 1 showing a conventional setup of a connection without the systems and methods described herein.
Figure 3:
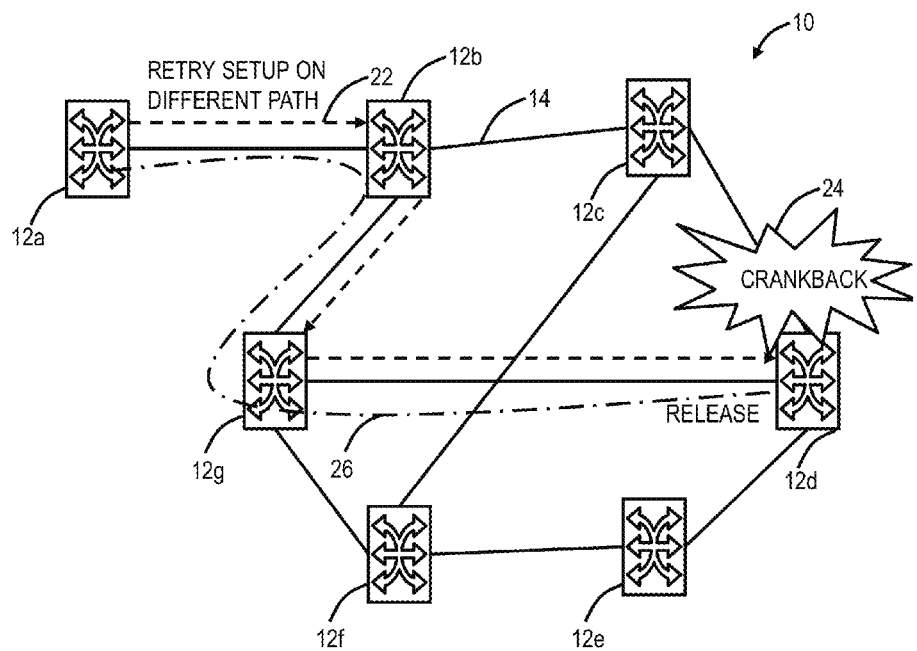
Figure 4:
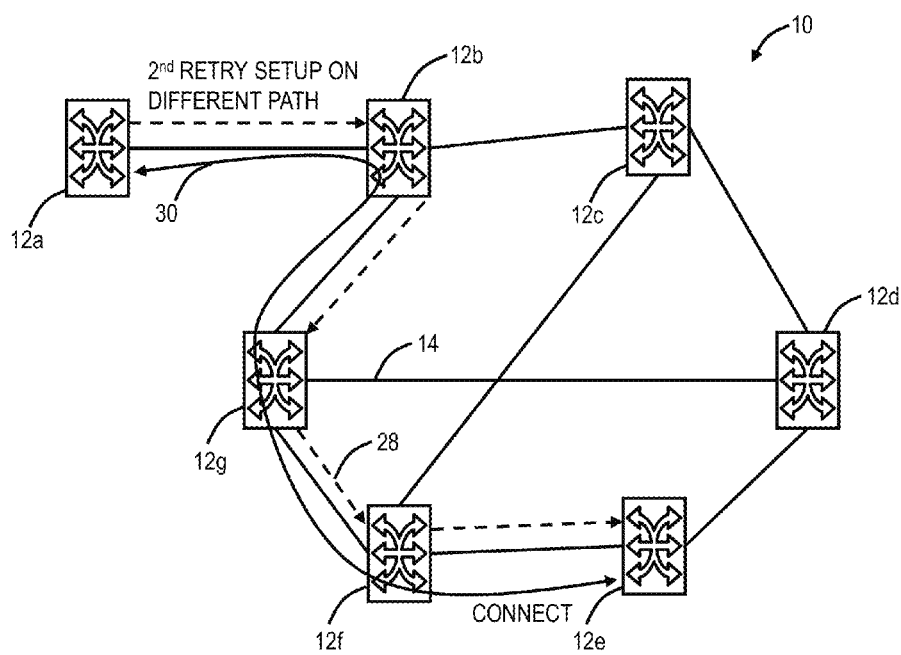

Referring to FIGS. 2-4, in a conventional embodiment, network diagrams illustrate the network 10 showing a conventional setup of a connection without the systems and methods described herein. Here, the node 12a is the originating node, and the node 12e is the terminating node. If FIG. 2, the node 12a computes path for a signaled connection {nodes 12a, 12b, 12c, 12d, 12e} with a set of Layer 0 attributes/constraints and sends an associated setup message 16 along the computed path. At the node 12b, the setup message 16 is received, and the node 12b validates all of the Layer 0 attributes/constraints, i.e. the node 12b can support the Layer 0 attributes/constraints. Thus, the node 12b sends the setup message 16 to the node 12c which determines it fails one or more of the Layer 0 attributes/constraints. Thus, there is a crank back 18 at the node 12c which sends a release message 20 back to the originating node 12a.

In FIG. 3, the originating node 12a receives the release message 20 and retries the setup on a different path with Layer 0 attributes/constraints. Here, the originating node 12a re-computes the path as {nodes 12a, 12b, 12g, 12d, 12e}, and sends a setup message 22 along the path. The setup message 22 is sequentially validated at the nodes 12b, 12g for the Layer 0 attributes/constraints, and sent to the node 12d which determines it fails one or more of the Layer 0 attributes/constraints. Thus, there is a crank back 24 at the node 12c which sends a release message 26 back to the originating node 12a. In FIG. 4, the originating node 12a receives the release message 26 and retries the setup on a second different path with Layer 0 attributes/constraints. Here, the originating node 12a re-computes the path as {nodes 12a, 12b, 12g, 12f, 12e}, and sends a setup message 28 along the path where it is validated at all of the intermediate nodes 12b, 12g, 12f, and a connection 30 is established. As is shown in FIGS. 2-4, in traditional control plane service, setup is cranked-back from the point of conflict. In L0 networks, these conflicts are defined by numerous network constraints described herein. This can lead to blocking/delayed setup of services, which otherwise can be routed by converging on different service parameters (paths or wavelength).

L0 Attribute/Constraint Convergence Through an Aggregation Process

The systems and methods can include propagating a setup message from an originating (source) node towards a terminating node in the network with associated Layer 0 attributes/constraints. An intermediate node does not necessarily institute a crank back if there is a validation failure. Instead, information is aggregated as to failure causes such that a single crank back can be implemented with modifications to the Layer 0 attributes/constraints. The Intermediate node(s) that reject the call setup can include additional useful information in a new IE (Information Element) and forward the setup message with the new IE upstream, or crank back immediately if the call is determined to be untenable on this node. At the terminating node if the new IE is present a release message is sent back. This release message will have an aggregation of all the cause codes in the incoming setup message's new IE along with any cause code and additional information pertinent to the terminating node. On the way back, the intermediate nodes that previously accepted the call can optionally modify the release message with additional information based on resources available locally. The originating node on receiving the release message with the new additional information can obtain a realistic current view of the end-to-end path and make better decisions in path selection on a retry.

Figure 5:
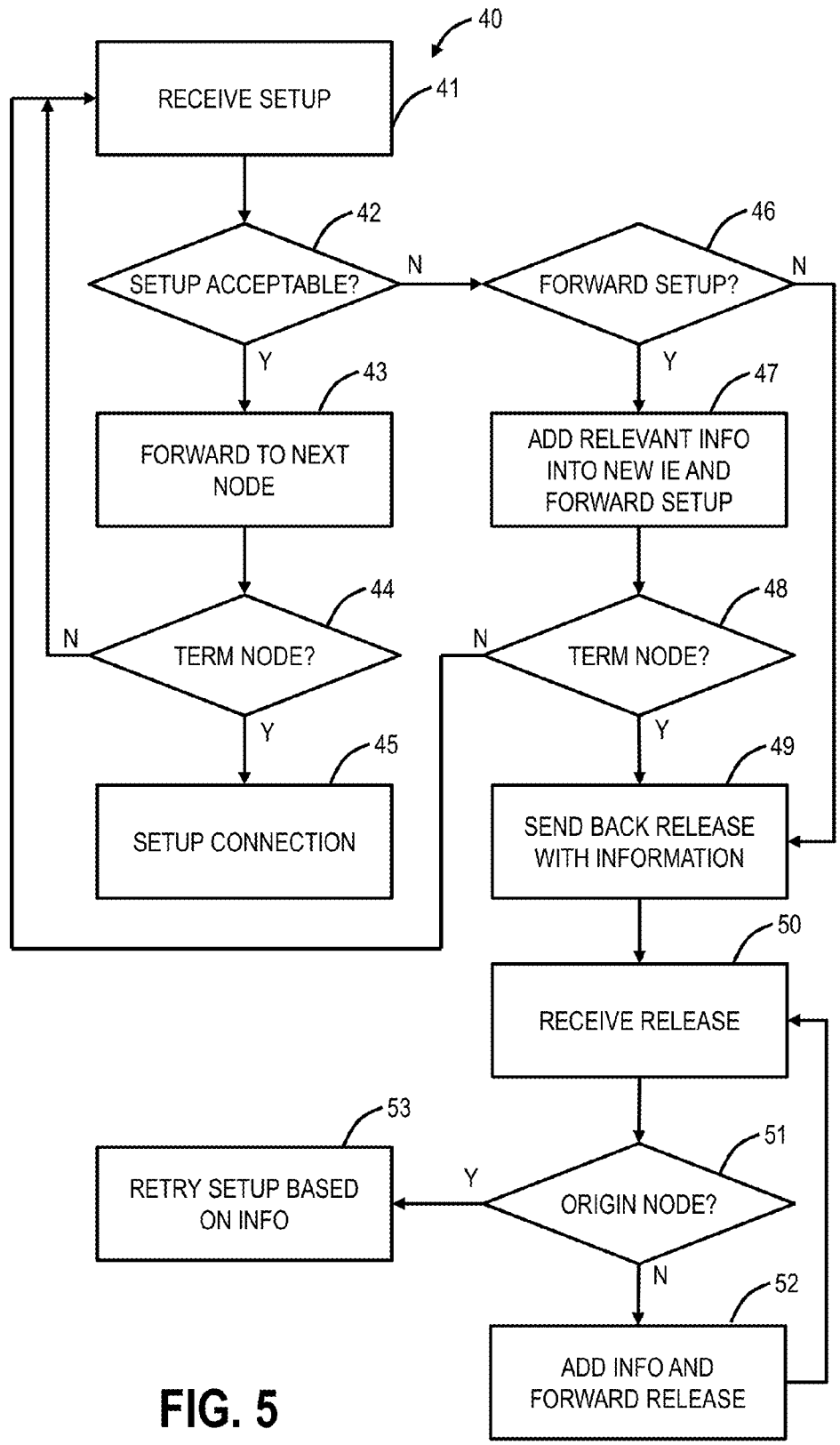
FIG. 5 is a flowchart of an aggregation process which adds information to setup and release messages during call setup if there are Layer 0 validation issues.
Figure 6:
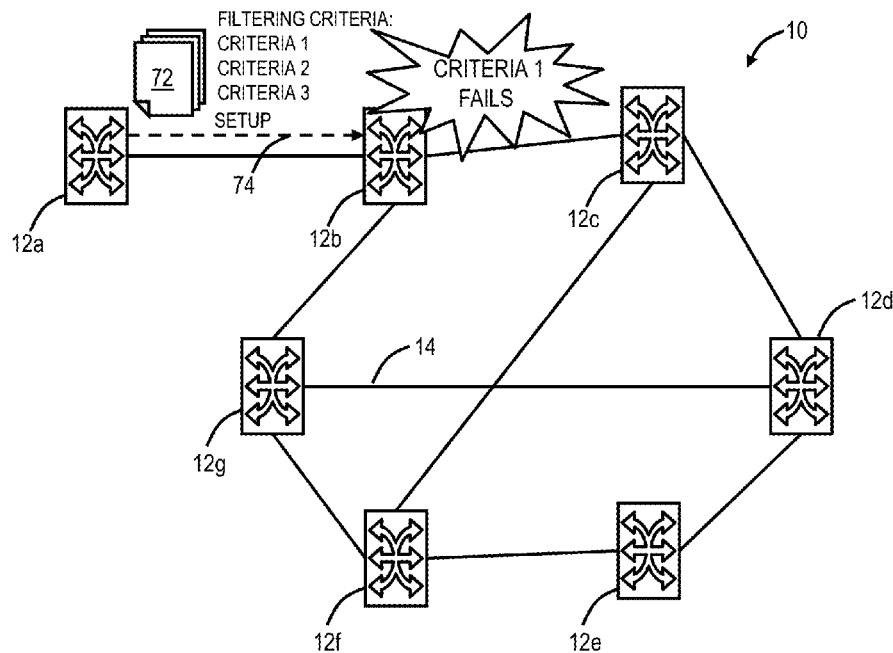
FIGS. 6-9 are network diagrams of the network of FIG. 1 showing a setup of a signaled connection with the aggregation process of FIG. 5.

Referring to FIG. 5, in an exemplary embodiment, a flowchart illustrates an aggregation process 40 which adds information to setup and release messages during call setup if there are Layer 0 validation issues. The aggregation process 40 contemplates operation in the network 10 on the nodes 12. Prior to the aggregation process 40, an originating node has computed a path for a call (i.e., a signaled connection) with associated Layer 0 attributes/constraints, and a setup message has been forwarded on the path. The aggregation process 40 includes receiving the setup message at one of an intermediate node or a terminating node (step 41). Here, the receiving node evaluates the Layer 0 attributes/constraints in the setup message to determine if the setup is acceptable (step 42). Note, the setup is considered to not be acceptable if any nodes rejected the setup message by adding a rejection cause and additional information in the setup message.

If the setup is acceptable (step 42), the receiving node forwards the setup message to the next node in the path (step 43), and if the next node is not the terminating node (step 44), the aggregation process 40 returns to the step 41. If the next node is the terminating node (step 44), the aggregation process 40 establishes the connection based on all of the Layer 0 attributes/constraints and based on the setup message successfully being validated at all nodes in the path (step 45).

If the setup is not acceptable at the receiving node (step 42), the receiving node has determined there is a failure or inability to meet one of the Layer 0 attributes/constraints, i.e. a rejection. At the receiving node where the rejection happens, a decision is made as to whether to forward the setup message further along the path or to crank back with a release message immediately (step 46). The decision to reject or continue upstream is based on the current or preceding node's error condition. That is, the setup message will include the Layer 0 attributes/constraints and any new or modifications thereof. The receiving node has already determined that it rejects these Layer 0 attributes/constraints, and now must decide if this rejection can be "cured" based on a modification of the Layer 0 attributes/constraints. In any event, the rejection cause and additional information is added to a new information element (IE) in the setup message or release message as the case may be.

At the intermediate nodes, a comparison is made with the corresponding locally available resources and the additional information in any of the new IEs along with the Layer 0 attributes/constraints in order to determine the resource's availability. Here, the receiving node is performing a local analysis to see if there is a way to modify the Layer 0 attributes/constraints to provide a valid configuration. Examples of this are discussed herein, but once such example may include Layer 0 attributes/constraints requiring a specific wavelength, $\lambda_N$, and the receiving node may have specific wavelength, $\lambda_N$, blocked, in-use, etc., but the receiving node can support any of a set of additional wavelengths. This would constitute a modification of the Layer 0 attributes/constraints. Here, the receiving node would add the rejection cause and additional information in the setup message and forward the setup message on the page (step 47). For example, node X cannot support the specific wavelength, $\lambda_N$, but can support any of the set of additional wavelengths.

Next, the aggregation process 40 checks if the next receiving node is the terminating node (step 48), and if not, the aggregation process 40 returns to the step 41. If the next receiving node is the terminating node (step 48) or if the decision is made to crank back (step 46), the aggregation process 40 includes sending back a release message, i.e. a crank back, to the originating node with all of the rejection causes and additional information included therein (step 49). Note, the setup message proceeds sequentially along the path from the originating node to the terminating node whereas the release message proceeds sequentially along the path from the crank back node (which can be the terminating node or any intermediate node) to the originating node. Thus, the release message will be processed by all nodes from the crank back node to the originating node.

Note, if the release message is sent from an intermediate node, this is indicative of a rejection that cannot be cured at this node by modifying the Layer 0 attributes/constraints. Thus, this release message will be sent back to the originating node with an appropriate cause code and information that will discourage the originating node from taking this path again. If the release message is sent from the terminating node, this is indicative of a rejection problem along the path, but one that can be cured through modification of the Layer 0 attributes/constraints.

The release message is received by a receiving node along the path towards the originating node (step 50). The aggregation process 40 includes checking if this receiving node is the originating node (step 51), and if not, the receiving node can optionally add additional information to the release message as well as forward the release message on the path back to the originating node (step 51) and return to the step 50. On the way back to the originating node, the other intermediate nodes that already accepted the call could add information relevant to their nodes based on the crank back cause code and associated information present in the release message received from upstream. The originating node on receipt of this release message (step 51) will extract all the rejection cause codes and node and link information and could retry on an alternate path totally diverse from the current path or alter the Layer 0 attributes/constraints along the same path (step 53).

The originating node of the call would get to know about possible error scenarios on an end-to-end basis and not just confined to the first node that rejects the call. This helps to make a judicious decision about re-routing/re-tuning services on a retry. The following provide an exemplary listing of various, non-limiting, scenarios where the intermediate nodes could experience a rejection based on the Layer 0 attributes/constraints.

Regenerator Port Unavailable

| | |
|---|---|
| Error | User provided regenerator port is unavailable at an intermediate node. |
| Action | The setup message is forwarded upstream with an appropriate cause code in the new IE.<br>This is because the path is good up to this node and the originating node could choose a different regenerator port on a retry, and would know which regenerator ports are available based on additional information in the new IE. |

Regenerator Port Unavailable for Specific Wavelength—Wavelength Contention

| | |
|---|---|
| Error | Competing signaled connections arriving on a same Optical Transmission Sections (OTSs) and using the same regenerator bank may require the same wavelength. |
| Action | The setup message will be allowed to proceed upstream with the new IE indicating the alternate wavelengths available on this regenerator node. |

Regenerator Port Unavailable for Specific Wavelength—Wavelength Actually not Available

| | |
|---|---|
| Error | Wavelength is used by someone else. |
| Action | The setup message will be allowed to proceed upstream with the new IE indicating the alternate wavelengths available on this regenerator node. |

Regenerator Modem Type Mismatch

| | |
|---|---|
| Error | User provided modem type does not match that of the regenerator port at an intermediate node. |
| Action | The intermediate node could reject it immediately since the modem type needs to be correctly matched. |

Terminating Drop Port is Colored/Colorless

| | |
|---|---|
| Error | The originating drop port is colorless and terminating drop port is colored/colorless. The wavelength of the signaled connection does not match the terminating drop port's wavelength capability. |
| Action | A release message is sent back containing the wavelength(s) supported. The originating node can retry the signaled connection on that indicated wavelength. |

Partial Connectivity

| | |
|---|---|
| Error | An intermediate node may not have internal fiber connections from an ingress to an egress interface on a different shelf on the same node. This could lead to cross connect creation failure in the node after signaling completes successfully. |
| Action | The node will crank back the call with a new cause code to the originating node since the path is unreachable further upstream. |

Exemplary Operation of a Crank Back Scenario with Filtering Criteria

Referring to FIGS. 6-9, in an exemplary embodiment, network diagrams illustrate the network 10 showing a setup of a signaled connection with the aggregation process 40. Specifically, the originating node 12a wants to establish a connection 70 with the terminating node 12e. The originating node 12a computes a path, e.g., {nodes 12a, 12b, 12c, 12d, 12e}, and has associated Layer 0 attributes/constraints, i.e. filtering criteria 72. Here, for example, there are three criteria (labeled criteria 1, 2, 3) in the filtering criteria 72. The originating node 12a sends a setup message 74 on the path to the intermediate node 12b (FIG. 6), and the intermediate node 12b determines that it cannot support the criteria 1 (e.g., a specific wavelength is assigned, which is unavailable at the intermediate node 12b, but there are other wavelengths available.

Figure 7:
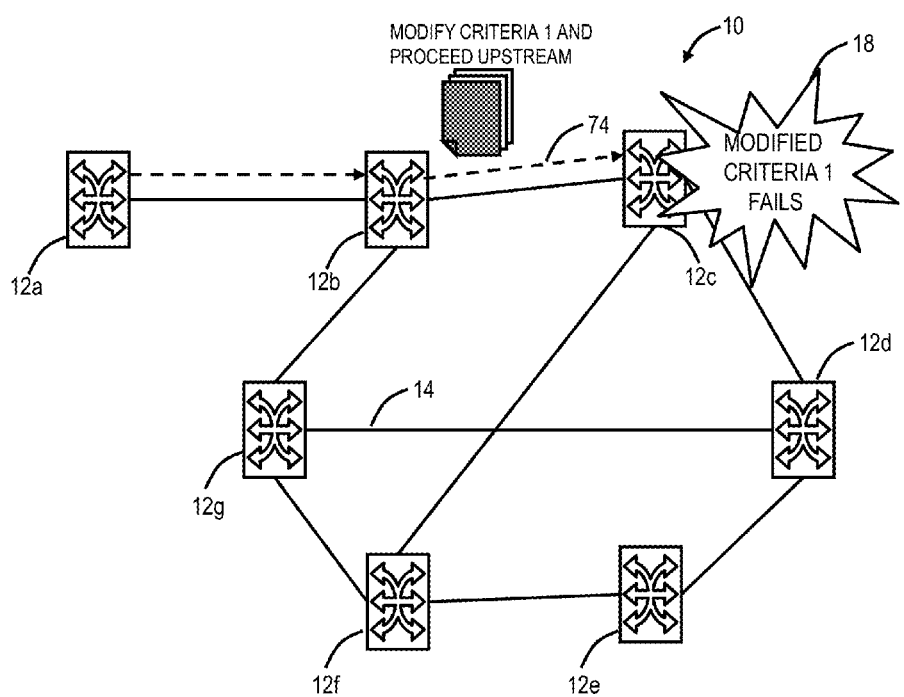

In FIG. 7, the intermediate node 12b modifies the criteria 1 and forwards the setup message 74 upstream to the intermediate node 12c. This is because the rejection of the criteria 1 at the intermediate node 12b is curable, i.e. this path is still possible, just not with the original filtering criteria 72. The intermediate node 12c receives the setup message 74 with the filtering criteria 72 including the modified criteria 1, and here it is determined that the intermediate node 12c determines that it cannot support the modified criteria 1, but it has a cure.

Figure 8:
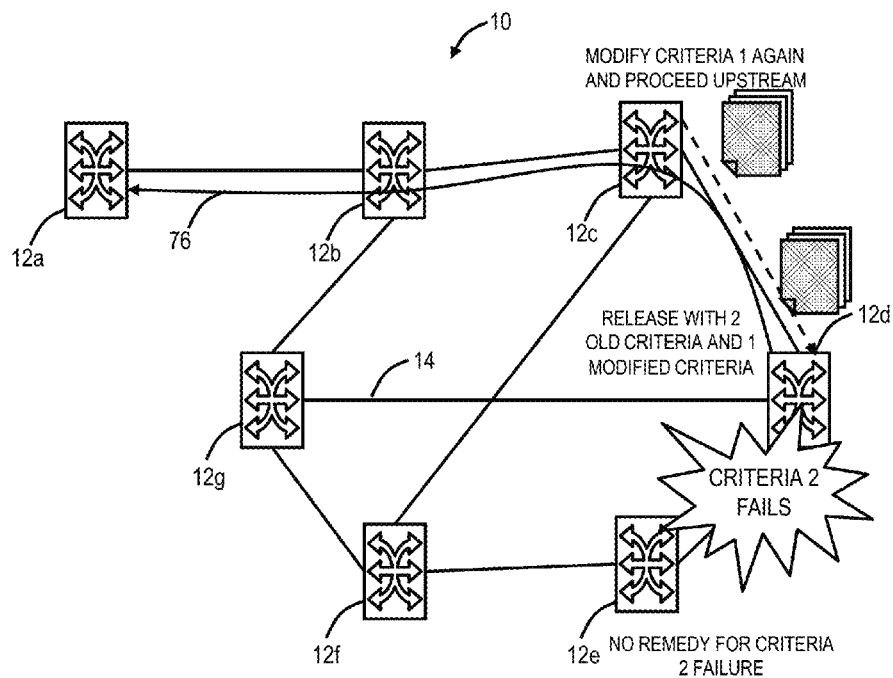

In FIG. 8, the intermediate node 12c modifies the modified criteria 1 again, and forwards the setup message 74 with its rejection cause and additional information to the intermediate node 12d. Here, the setup message 74 is received by the intermediate node 12d with the modified criteria 1 and the criteria 2, 3. However, the intermediate node 12d rejects the criteria 2, but does not have a remedy to cure this failure. Accordingly, the intermediate node 12d issues a release message 76 with all of the rejection causes and additional information (from itself and from the nodes 12b, 12c) and sends the release message 76 back to the originating node 12a.

Figure 9:
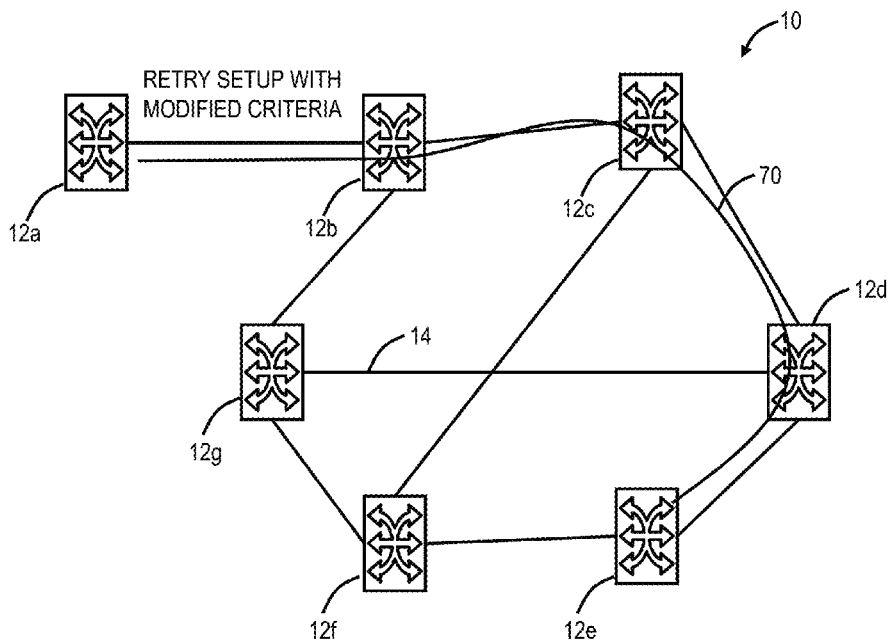

Along the way, the nodes 12b, 12c have opportunities to add additional information based on the rejection causes and additional information from the upstream nodes. In FIG. 9, the originating node 12a received the release message 76 with all of the rejection causes and the additional information. The originating node 12a can now retry setup with modifications to the filtering criteria 72 based on the aggregation information in the release message 76. Here, the same path is chosen, but with different filtering criteria 72, and the setup is successful at all of the nodes 12b, 12c, 12d, 12e, and the connection 70 is established.

Figure 10:
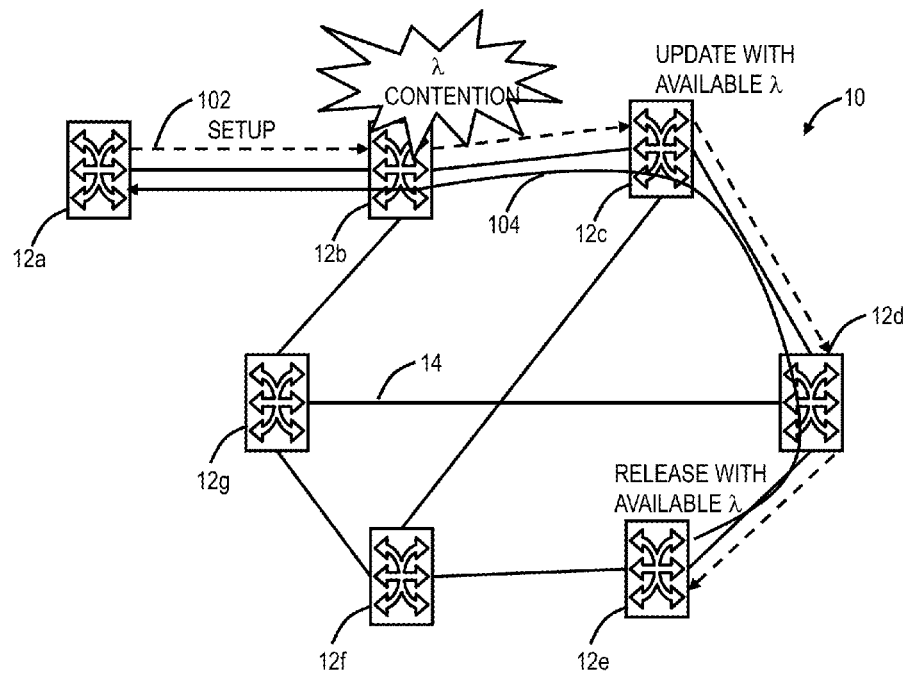
FIGS. 10-11 are network diagrams of the network FIG. 1 showing a setup of another signaled connection with the aggregation process of FIG. 5.
Figure 11:
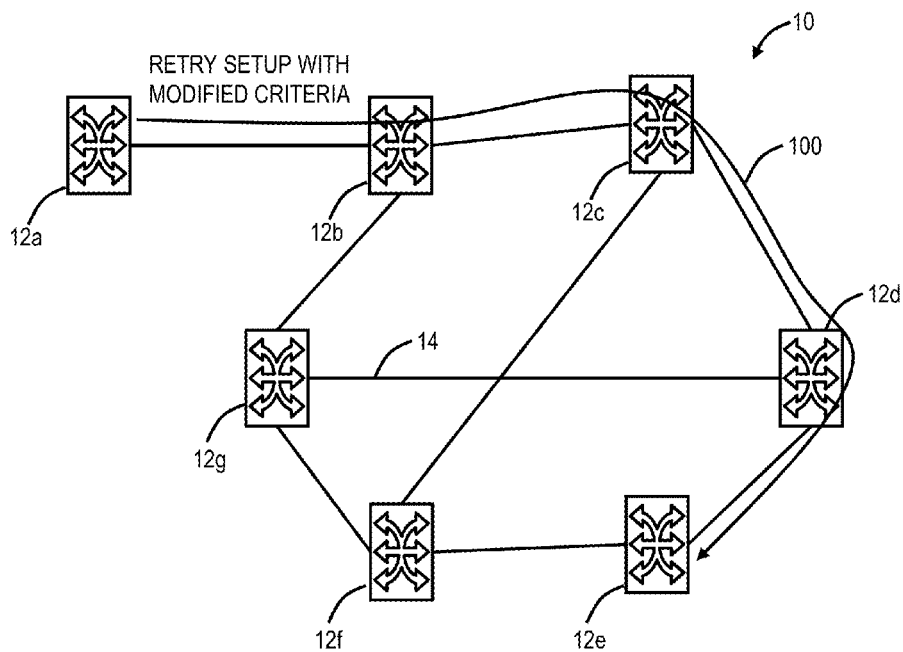

Exemplary Operation of a Crank Back Scenario with a Pass-Through to a Terminating Node Referring to FIGS. 10-11, in an exemplary embodiment, network diagrams illustrate the network 10 showing a setup of another signaled connection with the aggregation process 40. Similarly to FIGS. 6-9, here, the originating node 12a wants to establish a connection 100 with the terminating node 12e, and a path has been computed of {nodes 12a, 12b, 12c, 12d, 12e} with the Layer 0 attributes/constraints being specific wavelengths on the path. In FIG. 10, the originating node 12a sends a setup message 102 along the path and it is received at the intermediate node 12b. The intermediate node 12b determines there is a wavelength contention issue, and it updates the setup message 102 with the rejection cause (wavelength contention) and additional information (here are the wavelengths supported) and forwards the setup message 102 to the intermediate node 12c.

The intermediate node 12c receives the setup message 102 and checks the wavelength criteria and notes that it can support the original specific wavelengths on the path, but has a partial conflict with the wavelengths supported by the intermediate node 12b. Thus, the intermediate node 12c can update the setup message 102 to reflect the wavelengths it supports and forward to the intermediate node 12d. The intermediate node 12d can support any of the wavelengths in the setup message 102, and forwards to the terminating node 12e which aggregates all of the additional information (wavelengths supported) and forwards a release message 104 back along the path to the originating node 12a. Again, the intermediate nodes 12d, 12c, 12b can modify the release message 104 to reflect any additional wavelength issues. In FIG. 11, the originating node 12a has received the release message 104 and can retry the same path but with selecting different wavelengths, i.e. modified criteria, which are accepted by all of the nodes 12b, 12c, 12d, 12e, and the connection 100 is established.

Figure 13:
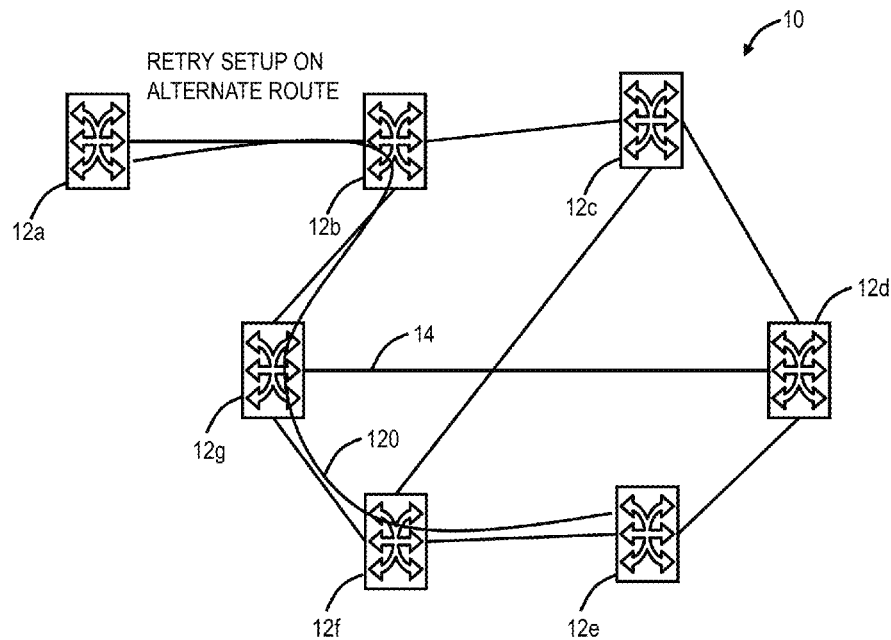

Exemplary Operation of a Crank Back Scenario with a Rejection from an Intermediate Node Referring to FIGS. 12-13, in an exemplary embodiment, network diagrams illustrate the network 10 showing a setup of yet another signaled connection with the aggregation process 40. Similarly to FIGS. 6-11, here, the originating node 12a wants to establish a connection 120 with the terminating node 12e, and a path has been computed of {nodes 12a, 12b, 12c, 12d, 12e} with the Layer 0 attributes/constraints being specific wavelengths and regenerator ports on the path. Here, the originating node 12a sends a setup message 122 along the path to the intermediate node 12b with the setup message 122 including the specific wavelengths and regenerator ports. At the intermediate node 12b, there is a rejection because the specific regenerator ports are unavailable, but the intermediate node 12b can use a different regenerator port. Thus, the intermediate node 12b updates the setup message 122 with the rejection cause and additional information and forwards the setup message 122 to the intermediate node 12c.

At the intermediate node 12c, there is a fatal rejection in that the intermediate node 12c does not have connectivity on its degrees to the intermediate node 12d, i.e. partial connectivity. Since this is a fatal rejection (not curable), the intermediate node 12c issues a release message 124 to the originating node 12a accordingly. In FIG. 13, the originating node 12a can compute an alternate path {nodes 12a, 12b, 12g, 12f, 12e} and perform the call setup which in this example is successful, and the connection 120 is established.

Of note, regenerator port wavelengths are not advertised through OSRP, ASON, or GMPLS flooding. It is possible that a call is rejected at an intermediate regenerator node due to an unavailable wavelength on the regenerator ports. Instead of immediate crank back if more information is added regarding alternative wavelengths available and the call setup forwarded further upstream then subsequent nodes could examine this additional information and either crank back the call immediately if one of the nodes cannot accept the additional alternatives provided or forward it further upstream if the additional information is acceptable. On reaching the terminating node a release is sent back to the originating node with all the additional information. The originating node can make an accurate decision about what wavelength to use along this path or choose an alternate path.

Exemplary Node Architecture

Referring to FIG. 13, in an exemplary embodiment, a block diagram illustrates an exemplary node 12 for use with the systems and methods described herein. In an exemplary embodiment, the exemplary node 12 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 12 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 12 can be any digital system with ingress and egress digital signals and switching therebetween of channels, timeslots, tributary units, etc. While the node 12 is generally shown as an optical network element, the systems and methods contemplated for use with any switching fabric, network element, or network based thereon.

In an exemplary embodiment, the node 12 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 14, configured to operate the control plane as described herein. The node 12 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links 14 to/from the node 12. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 220 can include wavelength division multiplexing interfaces, short reach interfaces, and the like, and can connect to other line modules 220 on remote network elements, end clients, edge routers, and the like, e.g. forming connections on the links 14. From a logical perspective, the line modules 220 provide ingress and egress ports to the node 12, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or Ethernet switching.

Those of ordinary skill in the art will recognize the node 12 can include other components which are omitted for illustration purposes, and that the systems and methods described herein are contemplated for use with a plurality of different network elements with the node 12 presented as an exemplary type of network element. For example, in another exemplary embodiment, the node 12 may not include the switch modules 230, but rather have the corresponding functionality in the line modules 220 (or some equivalent) in a distributed fashion. For the node 12, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 12 is merely presented as one exemplary node 12 for the systems and methods described herein.

Exemplary Controller Architecture

Figure 14:
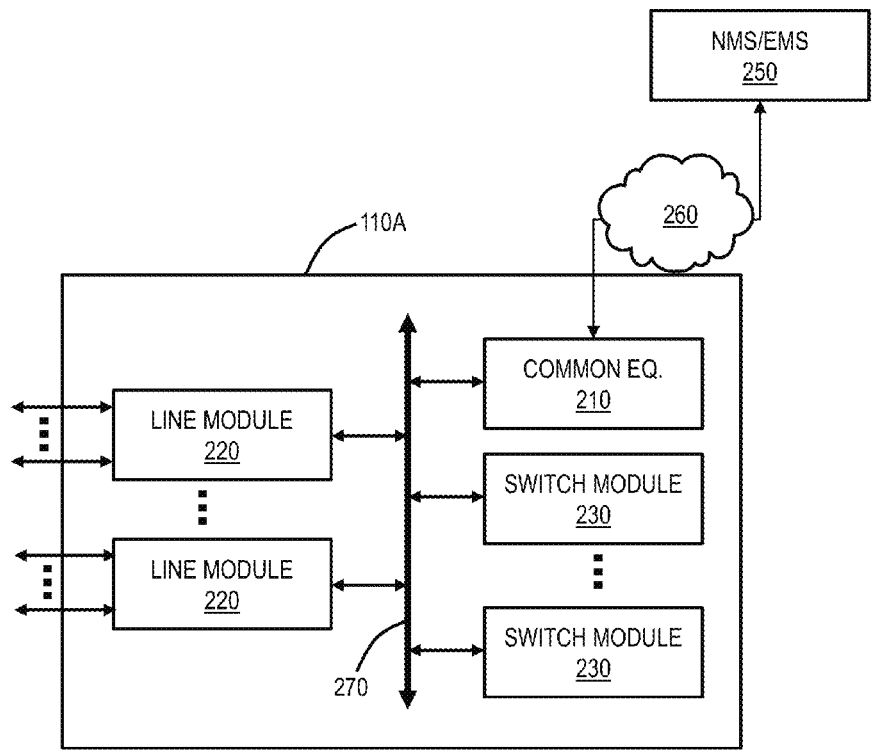
FIG. 14 is a block diagram of an exemplary node for use with the systems and methods described herein.
Figure 15:
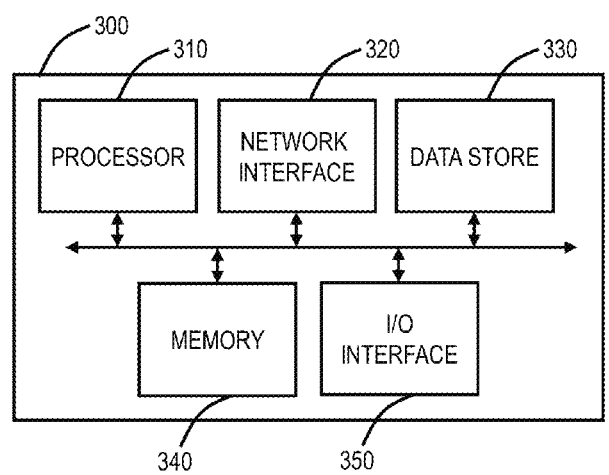
FIG. 15 is a block diagram of a controller to provide control plane processing and/or operations, administration, maintenance, and provisioning (OAM&P) for the node of FIG. 14.

Referring to FIG. 14, in an exemplary embodiment, a block diagram illustrates a controller 300 to provide control plane processing and/or operations, administration, maintenance, and provisioning (OAM&P) for the node 12. The controller 300 can be part of common equipment, such as common equipment 210 in the node 12, or a stand-alone device communicatively coupled to the node 12 via the DCN 260. The controller 300 can include a processor 310 which is hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an input/output (I/O) interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an exemplary embodiment, the controller 300 is configured to communicate with other controllers 300 in the network 10 to operate the control plane for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present disclosure, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 300 is configured to operate the control plane 130 in the network 10. That is, the controller 300 is configured to implement software, processes, algorithms, etc. that control configurable features of the network 100, such as automating discovery of the nodes 12, capacity on the links, port availability on the nodes 12, connectivity between ports; dissemination of topology and bandwidth information between the nodes 12; path computation and creation for connections; network level protection and restoration; and the like. As part of these functions, the controller 300 can include a topology database that maintains the current topology of the network 100 based on control plane signaling (e.g., HELLO messages) and a connection database that maintains available bandwidth on the links 14 again based on the control plane signaling. Again, the control plane 130 is a distributed control plane; thus a plurality of the controllers 300 can act together to operate the control plane using the control plane signaling to maintain database synchronization. In source-based routing, the controller 300 at a source node for a connection is responsible for path computation and establishing by signaling other controllers 300 in the network 10. For example, the originating node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links 14 through the nodes 12 from the source node to the destination node based on a plurality of constraints such as administrative weights on the links 14, bandwidth availability on the links 14, etc. The originating node can also defined the validation constraints that are provided in the setup messages.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, in an intermediate node in a control plane network, for selecting optimal routing parameters for Layer 0 Dense Wave Division Multiplexing (DWDM) network services, the method comprising:
   receiving a setup message from an originating node, wherein the setup message is sent towards a terminating node on a computed path in the control plane network, and the setup message indicates associated Layer 0 attributes/constraints, wherein Layer 0 information is not flooded in the control plane network;
   validating the associated Layer 0 attributes/constraints based on locally available resources; and
   performing one of:
      forwarding the setup message on the path towards the terminating node when validation is successful;
      forwarding the setup message on the path towards the terminating node with updated information indicating a rejection cause and additional information comprising wavelengths supported, when the validation is unsuccessful but a modification of the Layer 0 attributes/constraints is possible; and
      transmitting a release message on the path back to the originating node with updated information indicating a rejection cause and additional information comprising wavelengths supported when the validation is unsuccessful and no modifications of the Layer 0 attributes/constraints are possible.

2. The method of claim 1, wherein the setup message is received at the terminating node after the intermediate node, and wherein the terminating node is configured to perform one of:
   establishing a connection if the setup message was successfully validated at all nodes in the path; and
   transmitting the release message on the path back to the originating node with rejection causes and additional information from all intermediate nodes included therein.

3. The method of claim 2, further comprising:
   receiving the release message from the terminating node;
   updating the additional information in the release message if required at the intermediate node; and
   forwarding the release message on the path back to the originating node.

4. The method of claim 2, wherein the originating node is configured to receive the release message from the terminating node, extract and review the rejection causes and additional information included therein, and determine a retry on the path with revisions to the Layer 0 attributes/constraints based on the reviewing or a retry on an alternate path.

5. The method of claim 2, wherein the setup message is determined at the terminating node as successfully validated at all nodes in the path, based on an absence of information elements with the updated information in the setup message received at the terminating node.

6. The method of claim 1, wherein the updated information, in the setup message or the release message, indicating the rejection cause and the additional information is a new information element.

7. The method of claim 1, wherein the Layer 0 attributes/constraints are any one or more of: regenerator port assignments; regenerator port assignments for a specific wavelength; modem type; drop port type being either colored or colorless; and degree connectivity at each node.

8. The method of claim 1, wherein the validating comprises comparing the locally available resources, at the intermediate node, with the Layer 0 attributes/constraints in the setup message and any of the rejection causes and additional information; and the method further comprises:
   modifying the setup message based thereon or generating the release message based thereon.

9. The method of claim 1, wherein the validating comprises determining that a regenerator port is unavailable per the Layer 0 attributes/constraints at the intermediate node; and the method further comprises:

updating the setup message with the rejection cause and the additional information indicates which regenerator ports are available at the intermediate node.

10. The method of claim 1, wherein the validating comprises determining that a regenerator port is unavailable per the Layer 0 attributes/constraints at the intermediate node based on wavelength contention for a specific wavelength; and the method further comprises:
updating the setup message with the rejection cause and the additional information indicates which alternate wavelengths are available at the intermediate node.

11. The method of claim 1, wherein the validating comprises determining that a regenerator port is unavailable per the Layer 0 attributes/constraints at the intermediate node based on unavailability of a specific wavelength; and the method further comprises:
updating the setup message with the rejection cause and the additional information indicates which alternate wavelengths are available at the intermediate node.

12. The method of claim 1, wherein the validating comprises determining a modem type mismatch per the Layer 0 attributes/constraints at the intermediate node; and the method further comprises:
generating the release message based on the modem type mismatch with the updated information based thereon.

13. The method of claim 1, wherein the terminating node is configured to determine a mismatch between drop port type with the originating node; and the terminating node is configured to transmit the release message based on available drop port types at the terminating node.

14. The method of claim 1, further comprising:
determining a partial connectivity block at the intermediate node; and
generating the release message based on the partial connectivity block with the updated information based thereon.

15. An intermediate node in a control plane network, for selecting optimal routing parameters for Layer 0 Dense Wave Division Multiplexing (DWDM) network services, the intermediate node comprising:
one or more ports communicatively coupled to one or more adjacent nodes; and
a controller communicatively coupled to the one or more ports, wherein the controller is configured to:
receive, via the one or more ports, a setup message from an originating node, wherein the setup message is sent towards a terminating node on a computed path in the control plane network, and the setup message indicates associated Layer 0 attributes/constraints, wherein Layer 0 information is not flooded in the control plane network;
validate the associated Layer 0 attributes/constraints based on locally available resources; and
perform one of:
forward the setup message on the path towards the terminating node when validation is successful;
forward the setup message on the path towards the terminating node with updated information indicating a rejection cause and additional information comprising wavelengths supported when the validation is unsuccessful, but a modification of the Layer 0 attributes/constraints is possible; and
transmit a release message on the path back to the originating node with updated information indicating a rejection cause and additional information comprising wavelengths supported when the validation is unsuccessful and no modifications of the Layer 0 attributes/constraints are possible.

16. The intermediate node of claim 15, wherein the terminating node is configured to receive the setup message, and perform one of: establish a connection if the setup message was successfully validated at all nodes in the path, and transmit the release message on the path back to the originating node with rejection causes and additional information from all intermediate nodes included therein.

17. The intermediate node of claim 16, wherein the controller is further configured to:
receive the release message from the terminating node;
update the additional information in the release message if required; and
forward the release message on the path back to the originating node.

18. A method, in an intermediate node in a control plane network, for selecting optimal routing parameters for Layer 0 Dense Wave Division Multiplexing (DWDM) network services, the method comprising:
receiving a setup message from an originating node, wherein the setup message is sent towards a terminating node on a computed path in the control plane network, and the setup message indicates associated Layer 0 attributes/constraints;
validating the associated Layer 0 attributes/constraints based on locally available resources; and
performing one of:
forwarding the setup message on the path towards the terminating node when validation is successful;
forwarding the setup message on the path towards the terminating node with updated information indicating a rejection cause and additional information comprising wavelengths supported, when the validation is unsuccessful but a modification of the Layer 0 attributes/constraints is possible; and
transmitting a release message on the path back to the originating node with updated information indicating a rejection cause and additional information comprising wavelengths supported when the validation is unsuccessful and no modifications of the Layer 0 attributes/constraints are possible; and
responsive to the validating comprising determining that a regenerator port is unavailable per the layer 0 attributes/constraints at the intermediate node based on wavelength contention for a specific wavelength, updating the setup message with the rejection cause and the additional information indicates which alternate wavelengths are available at the intermediate node.

19. The method of claim 18, wherein the setup message is received at the terminating node after the intermediate node, and wherein the terminating node is configured to perform one of:
establishing a connection if the setup message was successfully validated at all nodes in the path; and
transmitting the release message on the path back to the originating node with rejection causes and additional information from all intermediate nodes included therein.

20. The method of claim 18, further comprising:
receiving the release message from the terminating node;
updating the additional information in the release message if required at the intermediate node; and
forwarding the release message on the path back to the originating node.

* * * * *